United States Patent Office 3,549,277
Patented Dec. 22, 1970

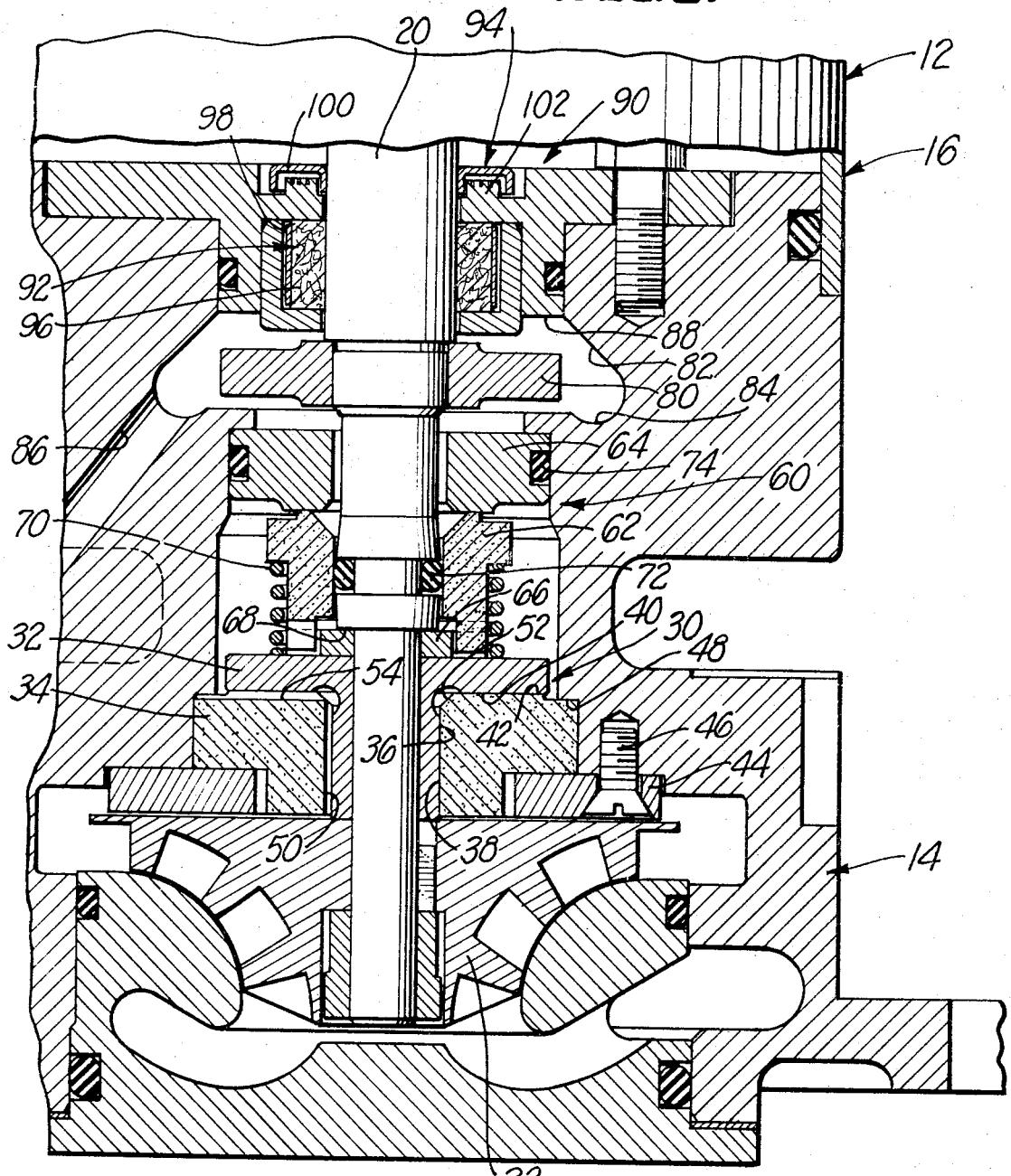
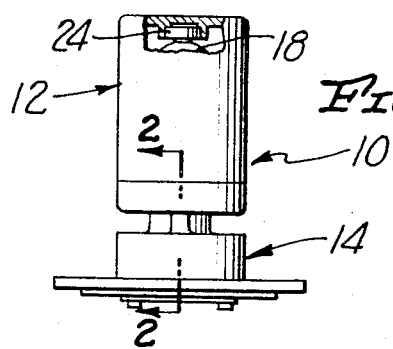

3,549,277
ELECTRIC MOTOR-DRIVEN ROTARY FUEL PUMP WITH WET CARBON BEARING
Nicholas de Kiss, North Hollywood, and Harris J. Howard, Granada Hills, Calif., assignor to DeLaval Turbine California Inc., Burbank, Calif., a corporation of California
Filed Mar. 17, 1969, Ser. No. 807,731
Int. Cl. F04d 13/02
U.S. Cl. 417—321    2 Claims

ABSTRACT OF THE DISCLOSURE

An electric motor-driven rotary fuel pump, or the like having a carbon bearing between the impeller and the main shaft seal thereof. With this construction, the carbon bearing is exposed to and lubricated by the fuel, or the like, pumped by the impeller. This wet carbon bearing carries both the radial loads and the thrust loads applied to the shaft by the various rotating components, including the armature, the impeller, and the like.

BACKGROUND OF INVENTION

The present invention relates in general to an electric motor-driven rotary fuel pump, and particularly a submerged booster pump, of the type which includes a vertically-oriented electric motor having an armature with a depending shaft, and which includes a pump below the motor and having an impeller mounted on the lower end of the armature shaft. For many years, commercially-available submerged booster pumps made by various manufacturers have been provided with a main shaft seal above the impeller and a sealed, prelubricated, ball bearing above the main shaft seal. Characteristically, such submerged booster pumps have short service lives because the fuel leaking past the main shaft seal continuously bathes the sealed ball bearing and, in a short time, enters the bearing and washes away the lubricant, whereupon bearing failure results.

One proposal for overcoming the foregoing problem involves replacing the sealed ball bearing with a wet carbon journal bearing located adjacent the impeller and exposed to and lubricated by the fuel, or the like, being pumped thereby. The wet carbon journal bearing also forms part of a shaft seal for separating the wet region of the assembly from the dry region thereof. Such an electric motor-driven submerged booster pump, an example of which is found in Pat. No. 2,598,484, granted May 27, 1952 to Harold E. Adams, overcomes some of the difficulties inherent in the commercially-available submerged booster pumps hereinbefore discussed, but is not a complete solution to the problem.

SUMMARY AND OBJECTS OF INVENTION

With the foregoing as background, a primary object of the invention is to provide an electric motor-driven rotary pump, and especially a submerged fuel pump, having just above the impeller thereof a wet carbon bearing which is both a journal bearing and a thrust bearing.

More particularly, an important object of the invention is to provide a wet bearing means for the armature shaft which includes: a rotatable bearing on and rotatable with the shaft just above the impeller and providing an outwardly-facing cylindrical journal surface and a downwardly-facing annular thrust surface; and a stationary carbon bearing carried by the housing and providing an inwardly-facing cylindrical journal surface and an upwardly-facing annular thrust surface respectively engaging the outwardly-facing cylindrical journal surface and the downwardly-facing annular thrust surface of the rotatable bearing, the rotatable and stationary bearings being exposed to and lubricated by the fuel, or the like, pumped by the impeller.

With the foregoing construction, the wet carbon bearing resists both radial and thrust loads, such as the thrust loads due to the weight of the rotating components, fluid reaction forces on the impeller, and the like. Consequently, there is no need to provide a separate thrust bearing in the motor end of the assembly, only a simple journal bearing, such as a ball bearing, being necessary. This is an important feature since the necessary thrust resistance can be incorporated in the wet carbon bearing more effectively, and with less expense, than with a separate thrust bearing in the motor end of the unit.

An even more important feature of the wet carbon journal and thrust bearing of the invention resides in the close tolerances which can be attained initially, and maintained through long periods of use, in both the radial and axial directions. By comparison, a ball-type thrust bearing is a very "sloppy" device initially, and rapidly becomes more so with use, so that axial impeller clearances are quite variable, and change with time. The present invention achieves much closer control of impeller clearances, both initially and throughout long periods of use, which is very important.

Another object of the invention is to provide a main shaft seal above and independent of the wet carbon journal and thrust bearing, and including a rotatable annular seal connected to and rotatable with the shaft and a stationary annular seal connected to the housing and engaged by the rotatable annular seal. By employing a main shaft seal which is independent of the wet carbon journal and thrust bearing, the sealing and bearing functions are performed more effectively.

Still another object of the invention is to provide a slinger on the shaft above the main shaft seal, the housing having an annular drain cavity encompassing the slinger, and to provide an auxiliary shaft seal above the slinger. Such auxiliary shaft seal prevents any fuel leaking through the main shaft seal in to the slinger region from entering the dry region of the unit, i.e., the motor end of the unit.

The foregoing objects, advantages, features and results of the present invention, together with various other objects, advantages, features, and results thereof which will be evident to those skilled in the art to which the invention relates in the light of this disclosure, may be achieved with the exemplary embodiment of the invention described in detail hereinafter and illustrated in the accompanying drawing.

DESCRIPTION OF DRAWING

In the drawing:
FIG. 1 is a view, partially in elevation and partially in vertical section, of an electric-motor-driven submerged rotary fuel booster pump of the invention; and
FIG. 2 is an enlarged, fragmentary, vertical sectional view taken as indicated by the arrowed line 2—2 of FIG. 1.

Description of exmplary embodiment of invention

Designated generally by the numeral 10 in FIG. 1 of the drawing is a motor-driven pump or motor-pump unit of the invention which is adapted to be mounted in an upright position, as shown in FIG. 1, in a submerged location in a fuel tank, not shown, in any suitable manner, as by mounting it on the bottom wall of the fuel tank.

The vertically-oriented motor-pump unit 10 includes an upper electric motor 12 and a lower rotary pump 14 having a common housing structure 16. The motor 12 includes an armature 18 having a depending shaft 20 on the lower end of which is mounted an impeller 22 forming part of the pump 14. As is conventional, the impeller 22 pumps fuel from the tank in which the unit 10 is submerged into a fuel line leading to an airplane engine, for example. Since such environmental structure is well known, it is not illustrated in the drawing.

The upper end of the shaft 20 is carried by a bearing 24 at the upper end of the motor 12. As will be explained, the bearing 24 is not required to resist any thrust loads and can thus be a simple ball bearing for resisting radial loads only.

Axial thrust loads due to the weight of the various rotatable components, such as the armature 18, the shaft 20, the impeller 22, and the like, and axial thrust loads due to fluid reaction forces on the impeller 22, are opposed by a combination journal and thrust bearing means 30. The latter is located just above and in close proximity to the impeller 22 to minimize the impeller overhand, which is an important feature.

The bearing means 30 includes a rotatable metallic bearing 32 and a stationary carbon bearing 34 cooperating to resist both radial and thrust loads. More particularly, the rotatable and stationary bearings 32 and 34 are respectively provided with complementary outwardly-facing and inwardly-facing cylindrical journal surfaces 36 and 38, and are respectively provided with downwardly-facing and upwardly-facing annular thrust surfaces 40 and 42.

The rotatable bearing 32 is suitably secured to the shaft 20 so as to rotate therewith, as by pressing it onto the shaft. The stationary carbon bearing 34 is suitably secured to the housing structure 16 of the motor-pump unit 10, as by means of a ring 44 secured by screws 46 to retain the stationary carbon bearing in a recess 48.

The bearings 32 and 34 are located in the wet region of the pump 14 immediately adjacent the impeller 22, and are thus exposed to and lubricated by the fuel, or the like, being pumped by the impeller 22. To insure lubrication of the journal surfaces 36 and 38 and the thrust surfaces 40 and 42, the journal surface 38 of the carbon bearing 34 is provided with a plurality of axial grooves 50 communicating at their lower ends with the impeller 22 and at their upper ends with an internal bevel 52. The annular thrust surface 42 is provided with radial grooves 54 communicating at their inner ends with the internal bevel 52. With this construction, fuel can flow from the impeller 22 upwardly through the axial grooves 50 and outwardly through the radial grooves 54 to lubricate the various journal surfaces 36 and 38 and thrust surfaces 40 and 42.

Completely independent of the bearing means 30 is a main shaft seal 60 which provides the principal barrier between the wet region of the pump 14 and the dry region of the motor 12. The main shaft seal 60 includes a rotatable annular seal 62 connected to and rotatable with the shaft 20 and a stationary annular seal 64 suitably connected to the housing structure 16. A seal driver 66 pressed on the shaft 20 between an annular shoulder 68 thereon and the rotatable bearing 32 drives the rotatable seal 62 through a suitable driving connection therebetween. A compression coil spring 70 biases the rotatable seal 62 axially into sealing engagement with the stationary seal 64, and an O-ring 72 in an annular groove in the shaft 20 provides a fluid-tight seal between the shaft and the rotatable seal 62. An O-ring 74 in an external annular groove in the stationary seal 64 provides a fluid-tight seal between the housing structure 16 and the stationary seal 64.

Secured to the shaft 20 above the main shaft seal 60 is a slinger 80 which throws any leakage escaping through the main shaft seal radially outwardly into an annular drain cavity 82 having an annular collecting groove 84 which conducts the leaakge to a drain passage 86 leading to a suitable point of disposal. The drain cavity 82 is provided at its upper end with an annular storage cavity 88 which serves to collect any leakage fuel that may be present in the event that the motor-pump unit 10 is stored upside down when removed from its fuel tank. This prevents such leakage fuel from saturating a seal assembly to be described in the next paragraph.

Above the slinger 80 and the drain cavity 82 is a redundant seal assembly 90 comprising a lip seal 92 and a labyrinth seal 94. The lip seal 92 is preferably made of a continuous felt band 96 held against the shaft 20 by a light spring 98. The felt band 96 is preferably saturated with a fuel resistant grease for friction reduction and better vapor sealing.

The labyrinth seal 94 includes a channel-shaped dust shield 100 pressed onto the shaft 20 with a small clearance between it and an annular labyrinth plate 102 suitably secured to the housing structure 16. The rotating dust shield 100 and the relatively long small-clearance passage between it and the plate 102 serve to prevent dust migration into the felt band 96 and also serve as a flame restrictor.

As hereinbefore set forth, by utilizing a wet carbon bearing 34 capable of sustaining both radial and thrust loads, a very effective bearing system is provided for the motor-pump unit 10 at minimum expense, it being necessary only to use a simple ball bearing for the bearing 24 at the motor end of the unit. The bearing 34 provides very close control of axial clearances for the impeller 22, both initially, and for long periods of use, which is an important feature. Further, using separate components for the wet bearing means 30 and the main shaft seal 60 permits each of these assemblies to perform its function more effectively.

Although an exemplary embodiment of the invention has been disclosed herein for purposes of illustration, it will be understood that various changes, modifications, and substitutions may be incorporated in this embodiment.

We claim as our invention:

1. In an electric-motor-driven rotary fuel pump, or the like, the combination of:
    (a) a housing containing a vertically-oriented electric motor having an armature with a depending shaft, and containing a pump below said motor and having an impeller mounted on the lower end of said shaft;
    (b) a rotatable bearing on and rotatable with said shaft just above said impeller and providing an outwardly-facing cylindrical journal surface, and a downwardly-facing annular thrust surface;
    (c) a stationary carbon bearing carried by said housing and providing an inwardly-facing cylindrical journal surface and an upwardly-facing annular thrust surface respectively engaging said outwardly-facing cylindrical journal surface and said downwardly-facing annular thrust surface of said rotatable bearing;
    (d) said rotatable and stationary bearings being exposed to and lubricated by the fuel, or the like, pumped by said impeller; and
    (e) a main shaft seal above and independent of said rotatable and stationary bearings and including a rotatable annular seal connected to and rotatable with said shaft and a stationary annular seal connected to said housing and engaging said rotatable annular seal.

2. An electric-motor-driven rotary fuel pump, or the like, as set forth in claim 1, including a slinger on said shaft above said main shaft seal and including an auxiliary shaft seal between said shaft and said housing above said slinger, said housing having an annular drain cavity encompassing said slinger.

References Cited

UNITED STATES PATENTS

| | | | |
|---|---|---|---|
| 2,832,292 | 4/1958 | Edwards | 103—87 |
| 3,031,973 | 5/1962 | Kramer | 103—87 |
| 3,195,466 | 7/1965 | Yound | 103—87 |

ROBERT M. WALKER, Primary Examiner